United States Patent Office 3,437,986
Patented Apr. 8, 1969

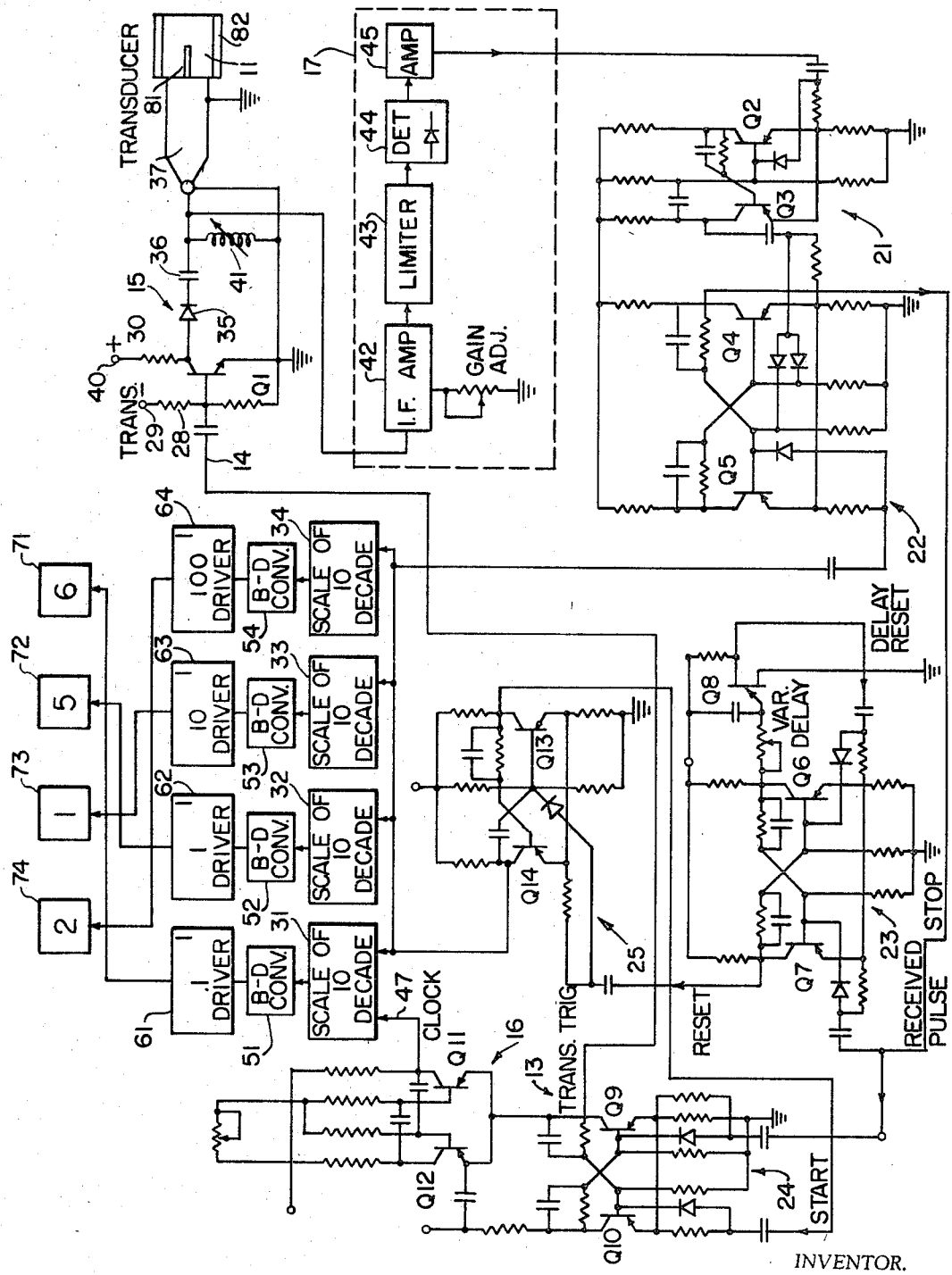

3,437,986
ECHO SOUNDING APPARATUS
Earl W. Noble, 41 Edgerly Road,
Boston, Mass. 02115
Filed Dec. 12, 1966, Ser. No. 600,980
Int. Cl. G01s 9/66
U.S. Cl. 340—3      4 Claims

ABSTRACT OF THE DISCLOSURE

An echo sounding system has an electroacoustical transducer that may sit at the bottom of a well. When shock excited, the transducer emits an acoustical pulse that is reflected from the water-air interface to produce an echo pulse transduced by the transducer into electrical form for amplification by a receiver to produce a received output pulse. At the time the sounding pulse is transmitted, a clock pulse generator is started. The received output pulse stops this clock pulse generator so that the number of clock pulses generated during the clock pulse source ON time interval is representative of the water level in the well and indicated on a nixie tube digital display. The transistor circuitry includes a normally nonconducting transistor biased substantially at avalanching potential in the nonconducting state so that transistors normally rated at relatively low collector-emitter potentials may be operated at much higher collector-emitter potentials.

Background of the invention

The present invention relates in general to signalling and more particularly concerns novel methods and means for echo sounding, typically useful in measuring the depth of a liquid body, such as water in a well. The invention achieves exceptional accuracy with equipment that is relatively inexpensive and easy to operate by relatively unskilled personnel.

Summary of the invention

According to the invention, there is transducing means for radiating a pulse of energy and responsive to an echo pulse representative of the distance between the transducing means and a predetermined interface for converting the echo pulse into a corresponding echo electrical pulse. Receiving means amplifies the echo electrical pulse. A gated clock pulse source commences providing clock pulses coincident with the activation of the transmitted pulse and stops providing clock pulses in response to the first received echo electrical pulse provided by the receiving means. The number of clock pulses provided during this interval is representative of the distance between the transducing means and the predetermined interface. When the transducing means is at the bottom of a well, this distance is representative of the depth of the water in the well.

According to another feature of the invention, certain preferred circuits comprise transistors maintained in a normally nonconducting state by means biasing the base-emitter junction of the transistor at least to substantially the avalanche breakdown potential, thereby allowing the collector-emitter potential existing across the nonconducting transistor to be much higher than the normal rated maximum collector-emitter potential of the transistor.

Numerous other features, objects and advantages of the invention will become apparent from the following specification when read in connection with the accompanying drawing.

Brief description of the drawing

The single figure of which shows a combined block-schematic circuit diagram illustrating the logical arrangement of a specific system according to the invention for accurate level indication.

Detailed description of preferred embodiments

With reference now to the drawing, there is shown a combined block-schematic circuit diagram illustrating the logical arrangement of a specific system according to the invention. The time interval between transmission of an energy pulse and reception of the corresponding echo pulse by transducer 11 causes indicator 12 to display the distance in feet of an interface comprising liquid, such as the surface of water in a well, to the transducer 11.

A typical system according to the invention comprises a modulating signal source 13, typically providing a pulse of two microseconds duration on line 14 to turn on both pulsed transmitter 15 and gated clock pulse source 16. Pulses are typically repeated at two-second intervals to provide an indicated measurement every two seconds. The display time may be variable, but preferably the maximum pulse repetition frequency is sufficiently low so that the time interval between successive pulses is longer than the time for an echo pulse to return to the transducer from the maximum distance measured by the specific system application.

Pulse transmitter 15 when thus turned on causes transducer 11 to transmit an energy pulse. Transducer 11 may typically comprise a barium titanate, lead zirconate or other suitable material annular transducing element radially or axially polarized in an appropriate substantially fluid-tight housing preferably arranged to match the acoustical impdeence of the transducer to that of the medium, such as water, in which it is situated. The transmitted energy pulse produces an acoustical energy wave that is partially reflected from an interface, such as the liquid surface, and returned to the transducer in a time interval corresponding to the ratio of the transducer-interface distance to the velocity of the acoustical energy in the liquid, such as water. Transducer 11 converts this echo pulse into a corresponding electrical signal that receiver 17 amplifies and applies to monostable multivibrator 21 to establish the astable state. Since this state is also initially established concurrently with the initiation of the transmitted pulse, monostable multivibrator 21 effectively disables the apparatus from responding to an echo pulse for the duration of the astable state, typically corresponding to about 400 microseconds or a depth of one foot of water, thereby allowing plenty of time for the transducer to stop ringing after being shocked by the transmitted pulse.

When an echo pulse sets monostable multivibrator 21 to its astable state, it provides an output pulse that sets flip-flop 22. Normally nonconducting transistor Q4 is then cut off to set monostable multivibrator 23 to its astable state, rendering normally conducting transistor Q7 off and normally nonconducting transistor Q6 on for a time interval, typically two seconds, determined by the delay circuit comprising transistor Q8 and associated circuit components, thereby determining the transmitted pulse repetition rate.

The signal from transistor Q4 also resets flip-flop 24 to render the normally conducting transistor Q9 nonconducting to turn clock pulse source 16 off.

When monostable multivibrator 23 is reset, it sets reset monostable multivibrator 25 to reset the scale of ten decades 31, 32, 33 and 34, typically to zero, and provide from the collector of transistor Q13 a start signal which resets flip-flop 24 to turn transistor Q10 off and transistor Q9 on and thereby start clock pulse source 16 oscillating, typically at a frequency of 23.47 kc.

The collector of transistor Q9 also provides a transmitter trigger pulse that renders transistor Q1 nonconductive to initiate an echo sounding pulse. With transistor Q1 nonconducting, diode 35 is rendered conductive to deliver a pulse of energy through capacitor 36 and coaxial transmission line 37 to transducer 11. Inductor 41 is preferably chosen so that it coacts with shunting capacitances, such as that of coaxial transmission line 37, to form a circuit resonant substantially at the frequency of the returned echo pulse, typically being of the order of 86.5 kc. Transistor Q1 conducts sufficiently heavily to bias diode 35 in the nonconducting state. Therefore, conducting transistor Q1 does not appreciably load this resonant tuned circuit.

The receiver 17 typically comprises an I-F amplifier 42 for amplifying the received signal of the order of 100 kc., a limiter 43, a detector 44 that provides the recevied echo pulse and an amplifier 45.

During the interval between initiation of the transmitted pulse and reception of the echo pulse, gated clock pulse source 16 energizes the count input 47 of scale of ten decade 31, the one associated with the least significant digit. When gated clock pulse source 16 is turned off, the count in the scale of ten decades 31–34 at that time represents the transducer-interface distance in feet to the nearest tenth of a foot. Decoding means comprising binary-to-decimal converters 51–54 then convert the stored signal in scale of ten decades 31–34, respectively, so that display drivers 61–64, respectively, are able to illuminate respective decimal digit display units 71–74, respectively, such as nixie tubes, to visually display the indicated distance in feet to the nearest tenth.

The invention has a number of advantages. Since during the astable period of monostable multivibrator 21 any pulses received by receiver 17 have no effect on the indicated measurement, clutter associated with the initial "bang" of the transmitter does not interfere wih the accuracy of the measurement. And since the first echo will normally be that from the nearest interface, the apparatus effectively responds to only this first echo, thereby resulting in the illustrated apparatus being relatively free from complexity, yet exhibiting a high degree of accuracy.

The specific blocks and circuits illustrated, with the exception of that associated with transistor Q1, are well known in the art. For example, gated clock pulse source 16 is a well-known free-running multivibrator with the connected-together emitters of transistors Q11 and Q12 returned through transistor Q9 of flip-flop 24, which determines the duration of free-running in correspondence with the time interval between transmission of an echo sounding pulse and return of the first echo. For sound traveling typically at 4,692 feet per second for fresh water the period of source 16 is typically 42.6 microseconds per tenth of a foot, corresponding to a frequency of 23.47 kc. The counting means 31–34, decoding means 51–54, driver means 61–64 and display means 12 could be any well-known visibly indicating decimal counter. Alternately, the counting means could comprise a pulse counter that provides an analog signal corresponding to the number of pulses provided during the clock pulse source ON time interval. This signal amplitude could then be displayed on a graphical recorder calibrated in distance. Numerous conventional techniques could be employed for providing the echo sounding pulse, transducing it and receiving and amplifying the returned echo pulse within the principles of the invention.

Considering more specifically the circuitry associated with transistor Q1, that illustrates a preferred form of transmitter and transducer arrangement incorporating an inexpensive transistor to produce a relatively high energy echo sounding pulse. Transistor Q1 may be an inexpensive transistor which sustains a collector-emitter potential in excess of normally rated values. Transistor Q1 may typically be a type 2N706 or 2N3903 mesa transistors having a rated collector-emitter voltage of 20 and 40 volts, respectively. The emitter of transistor Q1 is grounded. Its collector is connected to B+ terminal 40 by collector resistor 30 to apply a potential of 65 volts between the collector and emitter of transistor Q1 when transistor Q1 is turned off. Transistor Q1 is maintained at the normally nonconductive state by applying a negative potential from terminal 20 through current limiting resistor 28 that is sufficiently large to establish avalanching of the base-emitter junction instead of biasing the device just below cutoff in accordance with conventional techniques. This biasing technique according to the invention is believed to increase the effective collector-base barrier width to such an extent that the inexpensive transistor withstands a collector-emitter potential considerably in excess of the normal rating of the transistor. This technique is useful in a wide variety of circuits in which a semiconductor signal translating device shifts between conducting and nonconducting states and must bear a substantial collector-emitter potential when in the nonconducting state.

Capacitor 36 connects the collector of transistor Q1 to the center conductor of coaxial transmission line 37 having its outer conductor grounded. Inductor 41 is connected between the junction of capacitor 36 and ground. The other end of the center conductor of coaxial transmission line 37 is connected to the inner electrode 81 of transducer 11. The outer conductor of coaxial transmission line 37 is connected to the outer electrode 82 of transducer 11. An annular barium titanate element 83 transduces electrical and pressure wave signals.

The trigger pulse provided on line 14 is typically of the order of two microseconds duration and of amplitude sufficient to render transistor Q1 strongly conductive and open diode 35. Electrodes 81 and 82 and the annular barium titanate ring 83 therebetween effectively form a capacitor. This transducer capacitor suddenly receives charge from capacitor 36, producing a sharp burst of ringing at a frequency determined by the electrical and mechanical constants of transducer 11 and inductor 41, typically being adjusted to produce oscillations at 100 kc. A typical value for capacitor 36 is 1500 microfarads. Since upon reception of the echo pulse transistor Q1 is cut off and does not load the resonant circuit, the resonant circuit is especially sensitive to reception of the returned echo signals of the ringing frequency for amplification by receiver 17 without any special transmit-receive switching means.

The feature of operating transistors in the cutoff state biased substantially at avalanching potential of the base-emitter will be better appreciated when it is recognized that a type 2N706 mesa transistor costs only 58 cents whereas transistors having the full normal 50 or 65 volt rating for normal operating mode cost many times more.

An exemplary embodiment of this invention has been used to measure the depth of water and found to be repeatedly accurate to within 0.1 foot when measuring the water depth.

There has been described a novel echo ranging system characterized by accurate range indications with relatively lightweight compact apparatus of relatively low cost and high reliability. Since it is evident that those skilled in the art may now make numerous modifications and uses of and departures from the specific embodiments described herein, the invention is to be construed as embracing each and every novel feature and novel combination of features present in or possessed by the apparatus and techniques herein disclosed and limited solely by the spirit and scope of the appended claims.

What is claimed is:
1. Echo sounding apparatus comprising:
transducing means for providing an echo sounding pulse and converting an echo therefrom into an echo electrical signal,
triggering means for providing a triggering signal that initiates said echo sounding pulse,
a source of a clock signal,

ON means responsive to said triggering signal for activating said source of a clock signal to provide said clock signal and thereby initiate on ON time interval, OFF means responsive to said echo electrical signal for disabling said source of a clock signal to terminate said clock signal and said ON time interval, means for disabling said OFF means during a predetermined initial portion of said ON time interval, said source of a clock signal providing a train of clock pulses as said clock signal during said ON time interval, counting means responsive to said clock pulses for providing a count signal representative of the number of clock pulses which occurred during said ON time interval, said counting means comprising a digital counter, display means responsive to said count signal for providing a visible indication of the digital number represented by said count signal, said transducing means comprising a piezoelectric element insulatedly separating a pair of conducting surfaces to form a transducer capacitor and be characterized by a ringing frequency, inductive means, means for coupling said inductive means across said transducer capacitor to coact therewith and comprise a tuned circuit resonant at a resonant frequency near said ringing frequency, charge altering means responsive to said triggering signal for suddenly altering the charge on said transducer capacitor to shock excite said transducer and produce said echo sounding pulse, said tuned circuit comprising means for selectively transmitting said echo electrical signal to said OFF means, said charge altering means comprising, a source of a charging potential, means including a unilaterally conducting device in series with a coupling capacitor for coupling said charging potential source across said tuned circuit, and normally nonconductive switching means responsive to said triggering signal by then conducting for coupling said unilaterally conducting device through said then conducting switching means to a potential that renders the latter device nonconductive whereby charge on said coupling capacitor is suddenly transferred to said transducer capacitor to shock excite said transducer.

2. Echo sounding apparatus in accordance with claim 1 wherein said switching means comprises a transistor coupled to said source of charging potential, and means for normally biasing said transistor at least substantially at avalanching potential to normally maintain said transistor nonconductive and capable of withstanding a collector-emitter potential in excess of the normally rated maximum collector-emitter potential thereof.

3. Apparatus in accordance with claim 2 and further comprising:

a body of liquid having at least two successive interfaces, said transducing means being located at one of said interfaces, whereby said count signal is representative substantially of the shortest distance between said successive interfaces.

4. Echo sounding apparatus comprising:

transducing means comprising a piezoelectric element insulatedly separating a pair of conducting surfaces to form a transducer capacitor and characterized by a ringing frequency, inductive means, means for coupling said inductive means across said transducer capacitor to coact therewith and comprise a tuned circuit resonant at a resonant frequency near said ringing frequency, charge altering means responsive to a triggering signal for suddenly altering the charge on said transducer capacitor to shock excite said transducer and produce an echo sounding pulse, said tuned circuit comprising means for selectively transmitting an echo electrical signal transduced by said transducing means in response to an echo of said echo sounding pulse, said charge altering means comprising, a source of a charging potential, means including a unilaterally conducting device in series with a coupling capacitor for coupling said charging potential source across said tuned circuit, switching means responsive to said triggering signal for coupling said unilaterally conducting device to a potential that renders the latter device nonconductive whereby charge on said coupling capacitor is suddenly transferred to said transducer capacitor to shock excite said transducer, said switching means comprising a transistor having at least emitter and collector electrodes coupled to said source of charging potential, means for normally biasing said transistor at least substantially at avalanching potential to normally maintain said transistor nonconductive and capable of withstanding a collector-emitter potential in excess of the normally rated maximum collector-emitter potential thereof, and means for normally applying a potential between said emitter and collector electrodes when said device is nonconducting that exceeds the normal rated maximum emitter-collector potential of said device.

References Cited

UNITED STATES PATENTS

| 3,038,328 | 6/1962 | Henry. |
| 3,170,074 | 2/1965 | Hill _____ 331—165 X |
| 3,307,143 | 2/1967 | Wyse _____ 340—3 |

FOREIGN PATENTS 986,416  3/1965  Great Britain.

RICHARD A. FARLEY, *Primary Examiner.*

U.S. Cl. X.R.

331—166